UNITED STATES PATENT OFFICE.

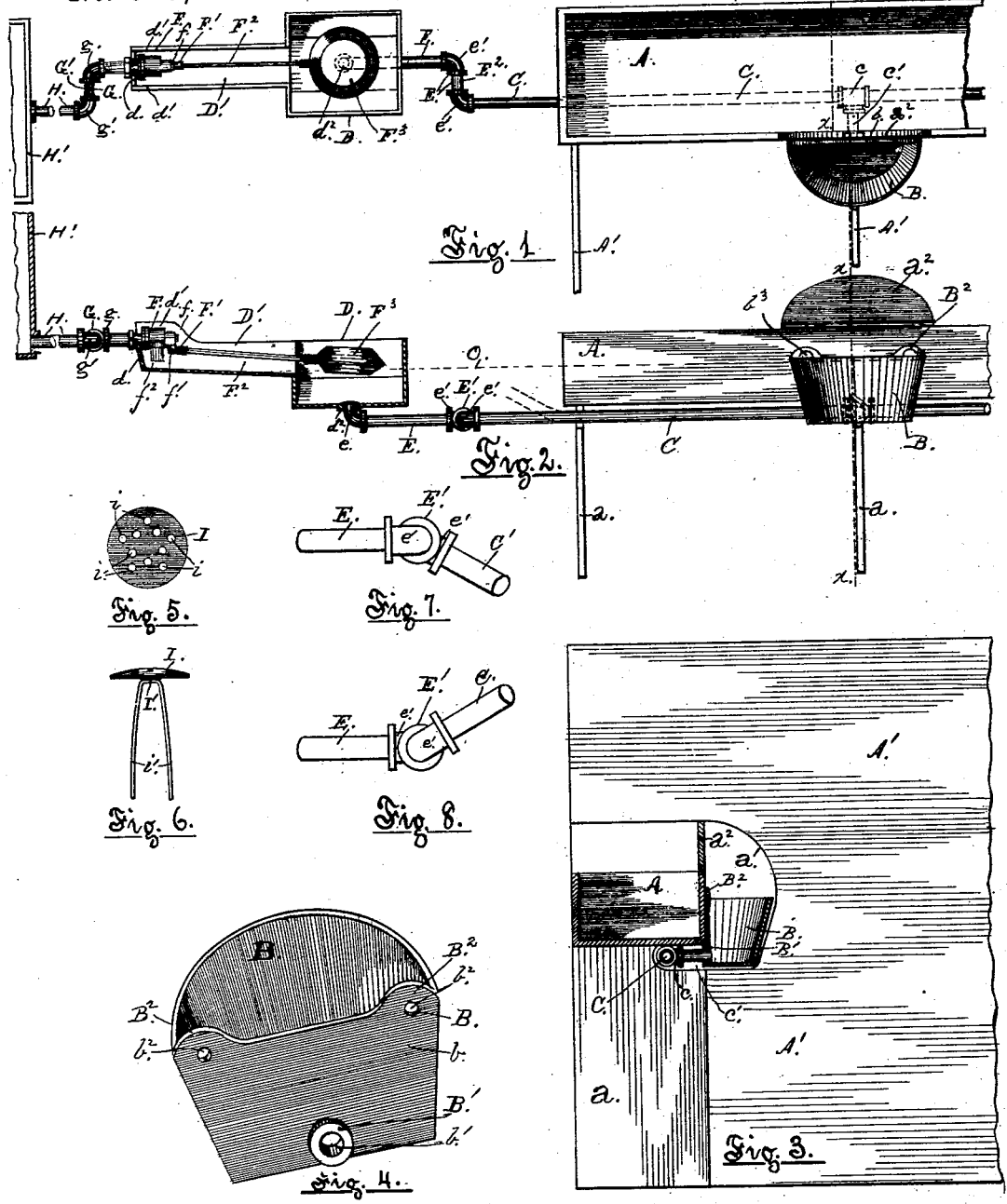

DAVID H. BAUSMAN, OF BAUSMAN, PENNSYLVANIA.

AUTOMATIC STOCK-WATERING DEVICE.

SPECIFICATION forming part of Letters Patent No. 569,079, dated October 6, 1896.

Application filed December 3, 1891. Serial No. 413,945. (No model.)

*To all whom it may concern:*

Be it known that I, DAVID H. BAUSMAN, of Bausman, in the county of Lancaster and State of Pennsylvania, have invented certain new and useful Improvements in Automatic Stock-Watering Devices; and I do hereby declare the following to be a full, clear, and exact description of the invention, such as will enable others skilled in the art to which it appertains to make and use the same.

This invention relates to improvements in a device to water stock, and is of that class in which water is taken from a reservoir by means of a faucet or valve operated by a float and, being conducted through pipes arranged underneath a trough or manger, is inducted into a series of troughs or bowls through their back walls and just above the bottoms thereof, said series of troughs or bowls being arranged against the outside of the front wall of the manger and placed in recesses formed in the forward edges of alternate stall-partitions, so that each trough or bowl may serve at the same time two animals occupying contiguous stalls.

The object of the invention is to provide means to water stock without further attention, to guard against the overflow of the water, and to keep the manger from which the stock is fed in a dry condition.

The particular features of the invention relate, first, to the peculiar construction of the watering troughs or bowls; second, to the arrangement of said bowls against the front wall of the manger and securing them thereto; third, to providing shields or guards to prevent particles from the manger from falling into the bowls; fourth, to the arrangement of a pipe underneath the manger and inducting water therefrom into the bowls through their flat or straight back walls and above the bottoms thereof; fifth, to the placing of a feed basin or pan and connecting it with said pipe by joints, whereby said pan may be set in a higher or lower plane; sixth, to arranging within said basin or pan a float connected with a valve or faucet whereby the inflow of water is automatically controlled; seventh, to connecting said valve or faucet to a pipe from the storage-reservoir or other water-source by means of a joint whereby said valve or faucet may be made to act, sooner or later, as may be desired, and, eighth, to providing a strainer whereby floating particles may be kept from entering the pipes to choke the same.

The purposes of the invention are attained by the means and devices illustrated in the accompanying drawings, in which similar letters of reference designate like parts throughout the several views, and in which—

Figure 1 is a plan of a watering device embodying the elements of the invention, but with portions of the reservoir, the manger, and of the supply and feed pipes removed for want of space in the drawings; Fig. 2, an elevation of Fig. 1 viewed from below, the float-pan and reservoir appearing in vertical longitudinal section; Fig. 3, a sectional end elevation, viewed from the left, of the portion which is to the right of the line $x\,x$ in Figs. 1 and 2; Fig. 4, an enlarged perspective view of the water trough or bowl, detached, from the position shown in Figs. 1, 2, and 3; Figs. 5 and 6, a plan and a side elevation, both enlarged, of the strainer detached; and Figs. 7 and 8, enlarged side views of the pipe-joints detached from Fig. 2, showing said joints as forming different angles.

Reference being had to the drawings, A designates a manger such as is ordinarily arranged along one side of a stable in which stock is housed, and $a$ the standards placed at stall-intervals, on top of which said manger is supported.

$A'$ represents an ordinary stall-partition placed between every two contiguous animals throughout the length of the manger, and $a'$ a recess in the forward end of alternate stall-partitions, in which the troughs or water-bowls are placed, while $a^2$ designates a guard or shield secured to the top of the front wall of the manger above each trough to prevent the falling of matter from the manger into said trough or bowl.

Reference being had to Fig. 4 of the drawings, B designates a watering trough or bowl which is formed entire, and is preferably made of cast-iron. It is semicircular or semi-elliptical in horizontal plan, being smaller at the bottom than at the top or open end. It has a straight or flat vertical back wall $b$, and its bottom is perpendicular therewith; but it may be rounded along its outer curved edge, if so desired. Just above the bottom this back wall is provided with a lug or boss B', having through its center a screw-threaded orifice $b'$, and at the extremities of its upper edge are upwardly-projecting lugs or ears $B^2$ and $B^2$, somewhat thickened to give additional strength, each ear being provided with a plain orifice $b^2$ to receive the action of an attaching-screw. Any number of these troughs or bowls may be arranged against the front wall of the manger, one being placed within the recess $a'$ of each alternate stall-partition and secured against the front wall of the manger by screws or bolts $b^3$, and the troughs are so placed that the bosses B', having the orifices $b'$, will be just below the bottom of the manger for easy connection with the water-feed pipe, and the troughs being thus arranged are each adapted to let two animals occupying separate but contiguous stall-partitions drink at the same time, Figs. 1, 2, and 3.

Underneath the manger and extending throughout the length thereof is arranged a pipe C, provided at a point opposite each trough B with a T-joint $c$, through which a branch pipe or nipple $c'$, screwed into the forward end of said joint and into the orifice $b'$ of the trough or bowl B, serves to connect said pipe with said trough or bowl for the induction of water thereinto just above the bottom thereof.

At any convenient point, but at no prescribed distance from the manger, is placed a basin or float-pan D, provided at one end with a hollow arm, or a V or U shaped trough D', opening through said end and made integral with the wall thereof. This trough has an upwardly-inclined bottom toward its outer end where an upwardly and outwardly sloping wall $d$ closes said end, and the two side walls are provided with upwardly-projecting ears or shields $d'$ and $d'$ to prevent the splashing of water over said walls, confining it to the trough, while through the bottom of this pan is an outlet-orifice $d^2$, but its particular location is not prescribed. This pan may be upheld by any approved means, and for that reason no support is shown in the drawings, and the pan is adapted to serve as a funnel, after being connected therewith, to feed the pipe C, before mentioned.

A pipe E has one end screwed into an end of an elbow $e$, which has its other end screwed into the orifice $d^2$ in the bottom of the pan D, while the other end of this pipe is connected with the forward end of the pipe C by means of a joint E', placed horizontally, said joint being formed by two elbows $e'$ and $e'$, screwed at one end onto the extremities of each of said pipes and joined by a short pipe or nipple $E^2$, having its extremities screwed into the other end of each of said elbows, Figs. 1 and 2. The arrangement of this joint is such as to allow the pan D to occupy a position in a higher or lower horizontal plane than the one shown, as compared with the one in which the troughs or bowls are placed. For bending the forward end of the pipe C slightly upward, as indicated by dotted lines C' in Fig. 2, and using the joint as it is shown in Fig. 7 the basin D may be placed in a higher plane, and, bending the pipe C in a direction opposite to that just mentioned and using the joint, as shown in Fig. 8, said basin may occupy a lower position. Again, by using two such joints between the basin and the manger the same purpose may be accomplished without bending the pipe C. This being so evident its separate illustration is deemed superfluous.

In the extreme end of the trough D' and between the shields $d'$ is placed an ordinary piston-valve F, its piston $f$ being moved backward or forward by means of an L-shaped lever F', pivoted at its apex to a point below said piston, as at $f'$, and $f^2$ being the outlet nozzle or spout of said valve through which water is admitted into the pan. To the lower arm of the lever F' is secured the forward end of a rod $F^2$, extended lengthwise through the trough D' well into the body of the basin D, where, to the rear end of said rod, is secured an air-tight bulb or float $F^3$, which may be of any approved form, to operate the valve. The construction and application of such valves and floats being so well known this brief description is deemed sufficient.

The inlet end of the valve F is secured into the forward end of an elbow $g$ of a joint G, having the rear end of its other elbow $g'$ screwed onto the forward end of a supply-pipe H, yet to be described, while the inner ends of said elbows are connected by a short pipe or nipple G', having its extremities screwed into said ends to complete said joint, adapting it to be arranged angularly like the joint E', (illustrated in Figs. 7 and 8,) whereby the valve F may be depressed or elevated, as compared with the water-level indicated by the dotted line O in Fig. 2 and said water-level set in a lower or higher plane when required.

The supply-pipe H, portions only of its ends being shown, having its forward end secured to the elbow $g'$, as described, and its rear end secured to a cistern or tank H', which may occupy any convenient position any distance removed from the pan D, the tank or cistern H' serving as a storage-reservoir, and the pipe H to conduct water from said tank to said pan, should be situated in a higher plane than the pan.

A circular disk I, having through its body a number of orifices $i$ for the passage of water and being made hollow or concave on the under side for additional strength, is provided on said under side with two arms $i'$, formed from a single strip or wire I', bent double at the center and rigidly secured thereto. Said arms are adapted to be inserted into the pipes $c'$ from within the bowls or troughs B, as also into the elbow $e$ from within the pan D to hold the disk thereto attached in place over the inlet into said troughs, as well as over the outlet from said pan, and the disk is adapted to strain the water and prevent floating particles from entering the pipes to choke the same.

In the drawings the supply-pipe H is shown as having one end connected with a tank or cistern serving as a storage-reservoir to furnish the needed water. This tank or cistern may be dispensed with and the pipe may have this end laid into a running stream or spring to obtain the necessary supply of water or the pipe may be connected with a force-pump or ram; but in this case the float controlling the valve must have sufficient buoyancy to resist the force of said pump or ram, and the rod $F^2$ of the float is shown as having one end attached to an arm of the angle-lever operating a piston-valve. This valve may be dispensed with and an ordinary spigot or plug-valve may be used instead, but in this case the plug must be placed horizontally and the forward end of the float-rod attached to the lever which rotates said plug. These arrangements being so evident this description is deemed sufficient without separate illustration.

Having now fully described the invention, what I do consider new, and desire to secure by Letters Patent, is—

1. The combination in a stock-watering device having the bowls, B, as described, secured to the front wall of a manger, as shown; with the feed-pipe, C, secured in position underneath said manger and close to the bottom thereof, and the branch pipes, $c'$, connecting said feed-pipe and said bowls through their back walls and above the bottoms thereof; of the feed-pan, D, as described, the pipe, E, having one end connected with the pan through the bottom thereof, and the vertically-adjustable joint, E', as described, connecting the free ends of the said pipes, E and C, as shown; and means provided, such as the float-valve, F, as described, to regulate the flow of water into said pan; all substantially as and for the purpose hereinbefore set forth.

2. In an automatic stock-watering device, in combination, the manger, A, as shown; the troughs, B, as described, secured to the front wall of said manger; the feed-pipe, C, underneath the manger and secured in position near the bottom thereof; the branch pipes, $c'$, connecting said feed-pipe and said troughs through their back walls and above the bottoms thereof; the feed-pan, D, as described, with the pipe, E, having one end secured through the bottom of the pan, and the vertically-adjustable joint, E', as described, connecting the adjacent ends of the said pipes, C and E, as shown; the float-valve, F, as described, to regulate the flow of water into said pan; and tubular connection provided, such as the vertically-adjustable joint, G, as described, and the pipe, H, to conduct water from a reservoir to the said valve; all substantially as described and for the purpose set forth.

In testimony whereof I have hereunto subscribed my name in the presence of two subscribing witnesses.

DAVID H. BAUSMAN.

Witnesses:
JAS. M. BAKER,
JOHN BAKER.